No. 862,893.

PATENTED AUG. 13, 1907.

J. R. FORDYCE.
COTTON CLEANING FEEDER.
APPLICATION FILED JUNE 29, 1904.

4 SHEETS—SHEET 1.

WITNESSES.
H. G. Fletcher.
B. F. Funk

INVENTOR.
JOHN R. FORDYCE.
BY Bakewell Cornwall
ATTYS.

No. 862,893. PATENTED AUG. 13, 1907.
J. R. FORDYCE.
COTTON CLEANING FEEDER.
APPLICATION FILED JUNE 29, 1904.

4 SHEETS—SHEET 2.

WITNESSES.
INVENTOR.
JOHN R. FORDYCE.
BY Bakewell + Cornwall
ATTYS.

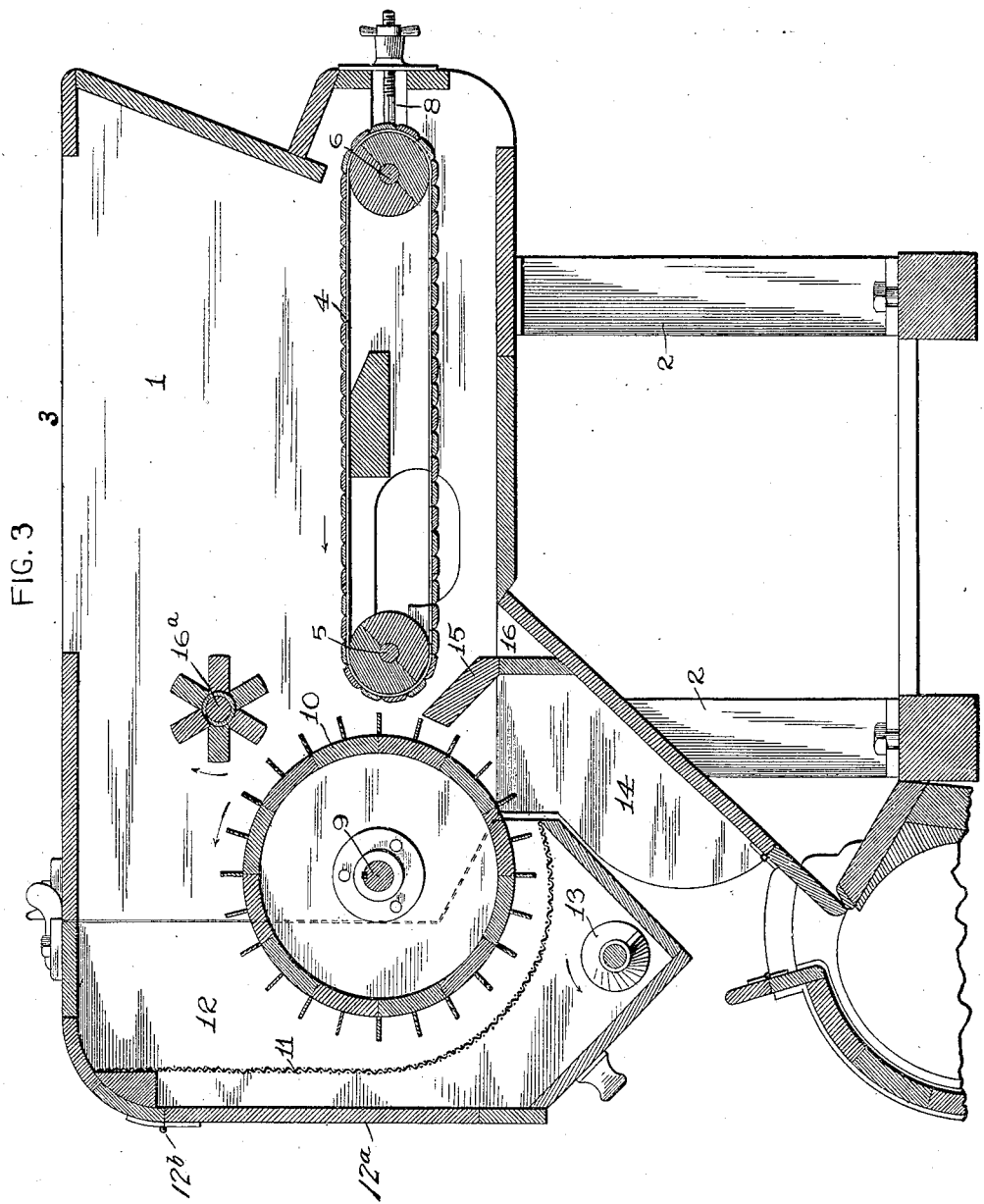

No. 862,893.

PATENTED AUG. 13, 1907.

J. R. FORDYCE.
COTTON CLEANING FEEDER.
APPLICATION FILED JUNE 29, 1904.

4 SHEETS—SHEET 4.

WITNESSES.

INVENTOR.
JOHN R. FORDYCE,

BY Bakewell Cornwall
ATTYS

UNITED STATES PATENT OFFICE.

JOHN R. FORDYCE, OF LITTLE ROCK, ARKANSAS.

COTTON-CLEANING FEEDER.

No. 862,893.  Specification of Letters Patent.  Patented Aug. 13, 1907.

Application filed June 29, 1904. Serial No. 214,619.

*To all whom it may concern:*

Be it known that I, JOHN R. FORDYCE, a citizen of the United States, residing at the city of Little Rock, county of Pulaski, State of Arkansas, have invented a certain new and useful Improvement in Cotton-Cleaning Feeders, of which the following is a full, clear, and exact description, such as will enable others skilled in the art to which it appertains to make and use the same, reference being had to the accompanying drawings, forming part of this specification, in which—

Figure 1:
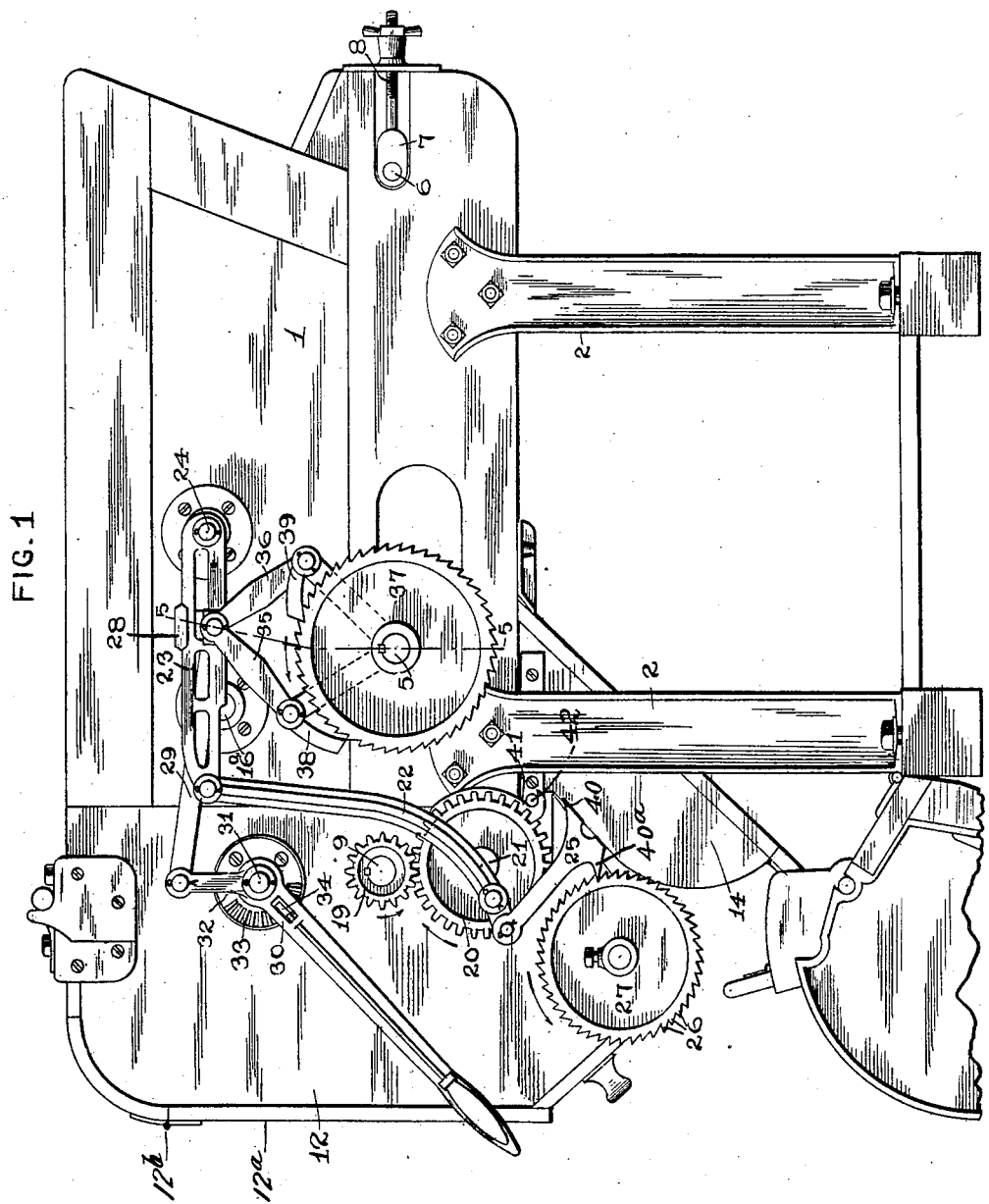
Figure 2:
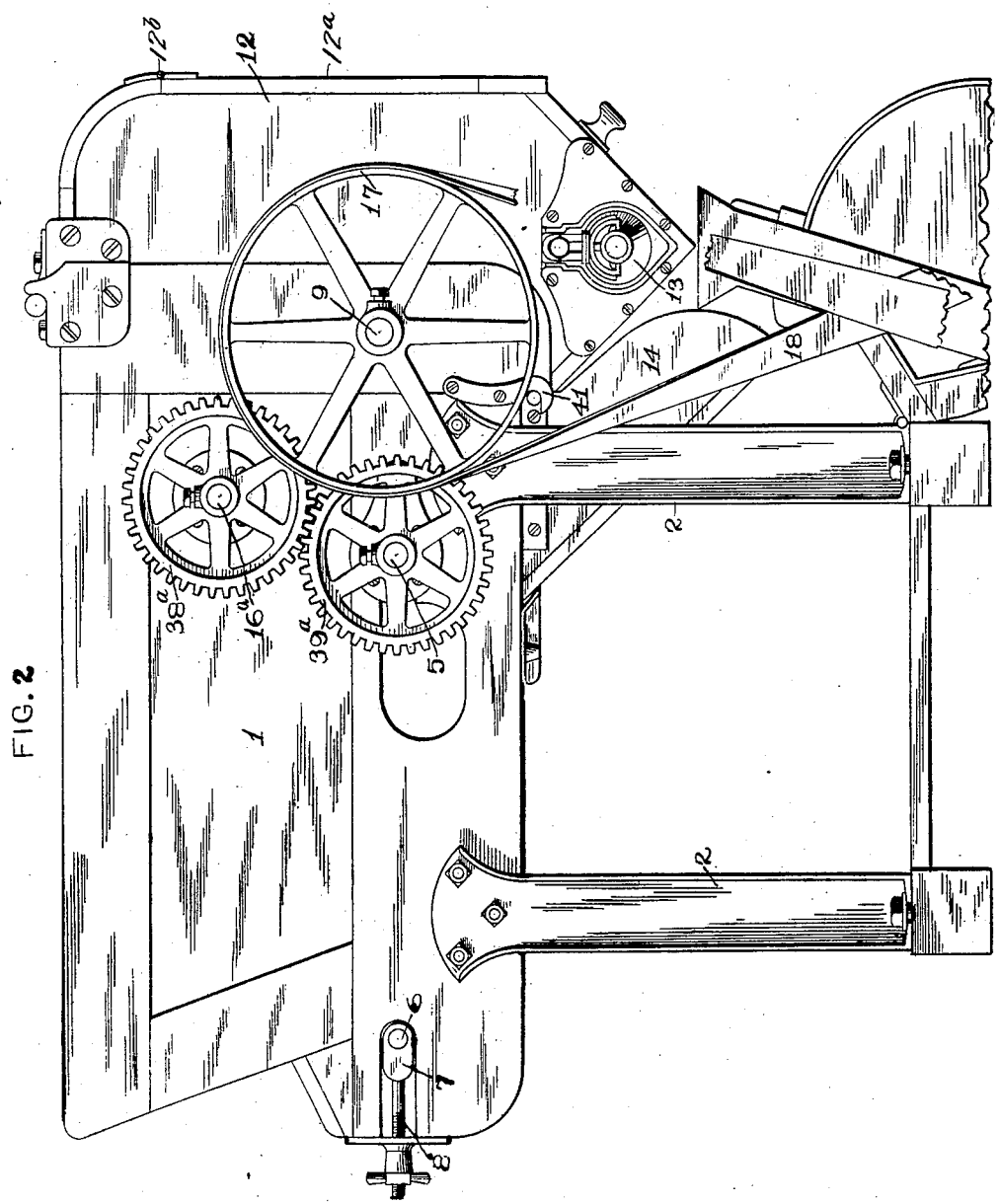
Figure 5:
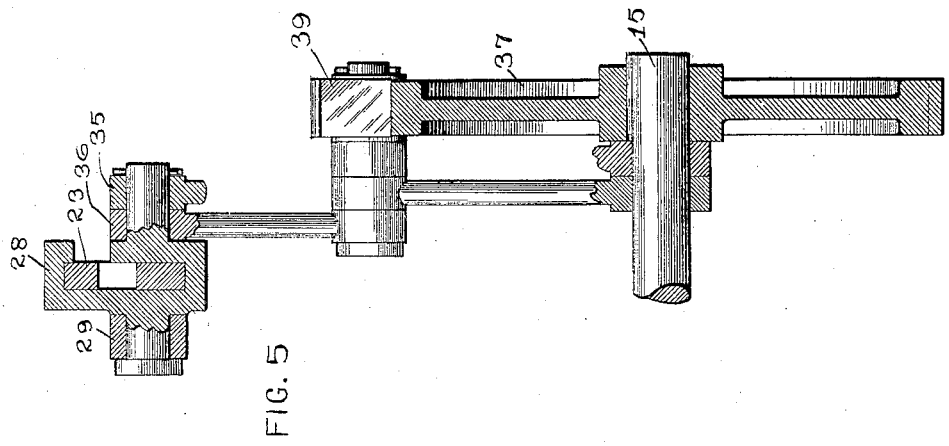
Figure 4:
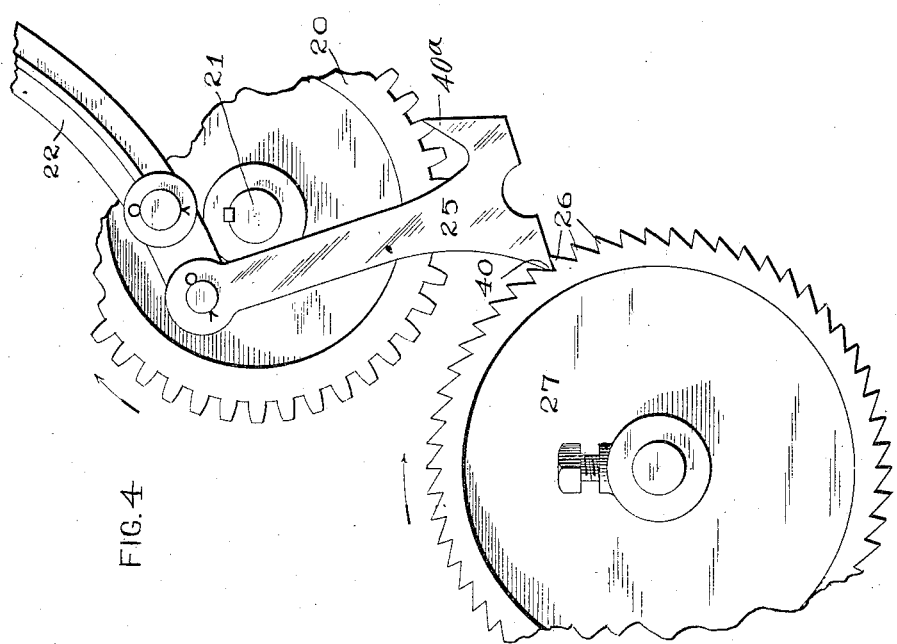

Figure 1 is a side elevational view of a cleaning feeder constructed in accordance with my invention; Fig. 2 is a similar view of the opposite side of the cleaning feeder; Fig. 3 is a vertical longitudinal sectional view through the cleaning feeder; Fig. 4 is a fragmentary elevational view of the gear on the picker roller shaft, the gear on the conveyer shaft, and the pawl reversed; and Fig. 5 is a vertical cross sectional view on the line 5—5 of Fig. 1.

This invention relates to cleaning feeders for cotton gins.

One of the objects of the invention is to provide a cleaning feeder which may be readily attached to a cotton gin or arranged in proximity thereto whereby the cotton will be tightly compressed as it is fed into the feeder and gradually pushed forward.

Another object is to provide a feeder having a picker wheel which will efficiently break open the bolls and tear the locks, so that when the cotton is thrown against the screen all dirt, leaf trash and other foreign substances will pass through the screen to be conveyed to the exterior of the feeder. By "locks" I mean that part of the cotton which is removed from the outer covering or boll and which consists of the seeds surrounded by the fiber.

Another object of the invention is to separate foreign elements such as nails, rocks, etc. from the cotton previous to its introduction into the gin.

A further object is to provide means whereby the feeder can be readily relieved should it become choked.

Another object is to provide a reversible ratchet mechanism whereby the feed from the dust conveyer may be reversed.

A still further object is to provide means whereby the speed of the feeder can be conveniently regulated.

With the above and other objects in view the invention consists in certain novel parts and combinations of parts all of which will be specifically described hereinafter, it being understood that changes in the form, pro50 portion and minor details of construction may be resorted to without departing from the spirit of this invention or sacrificing any of the advantages thereof.

In the drawings the reference numeral 1 designates a casing supported upon suitable standards 2. This casing has a hopper-like inlet 3 into which the cotton is fed by any suitable means, as, for example, a pneumatic feeder commonly in use.

The reference numeral 4 designates an endless feed apron which is illustrated as being positioned in the casing and beneath the opening 3. This apron is held in a horizontal position by the rotatable shafts 5 and 6, the shaft 6 being journaled in sliding bearings 7 longitudinally movable in the casing and adapted to be adjusted by the adjusting screws 8, whereby the slack in the apron may be taken up.

The numeral 9 designates a shaft journaled in the casing and which carries the picker roller 10, the periphery of which is contiguous to the discharge end of the apron 4. The picker roller 10 is provided with teeth which are adapted to break open the bolls and tear the locks previous to throwing the cotton against the screen 11 in rear thereof. The screen 11 is carried by a hinged part 12 of the casing and at its lower end conforms to the curvature of the periphery of the picker roller. The hinged part 12 is provided with a bottom in the form of a V and in the vertex of this bottom is a conveyer 13 illustrated as being of worm form. The part 12 is also provided with a door $12^a$ connected to said part by a hinge $12^b$ as clearly shown in Figs. 1, 2 and 3, to permit access to the screen 11.

14 designates a discharge chute beneath the picker roller which is of such form that the cotton which has been cleaned will be fed through the chute into the roll box of the gin.

15 is an abutment beneath the apron and adjacent to the picker roller. This abutment is so disposed with relation to the chute and the apron that a pocket 16 is formed which is designed for the purpose of receiving foreign elements such as nails, stones, etc. which may subsequently be removed.

The compression roller $16^a$ is mounted upon a shaft extending transversely through the casing 1 and compresses the cotton as it is fed from the apron onto the picker roller. On the picker roller shaft which extends through the casing is a drive pulley 17. This pulley receives motion from a suitable belt 18 which will preferably be driven from a pulley on the gin. On the end of the shaft 9 remote from the pulley 17 is a gear 19 which meshes with a gear 20 on a suitable shaft 21 journaled in the casing.

The curved pitman 22 is eccentrically mounted on the gear 20 and at one end pivotally engages a rocking arm 23 terminally supported on a suitable bearing 24. Adjacent to the eccentric connection of the pitman and the gear 20 is a reversible pawl 25 which is adapted to intermittently engage the teeth 26 on the ratchet 27 which is fastened to the shaft of the conveyer 13. A sliding head block or support 28 is carried by the arm 23, to which block is fastened a link 29 in engagement with the bell crank lever 30 fulcrumed as at 31 to the casting 32. This casting is provided with teeth which constitute a segmental rack 33 and which are adapted to be engaged by the spring-pressed pawl 34 carried by the lever.

Toggle levers 35 and 36 are independently mounted on the sliding block 28 and their complementary members are mounted upon the shaft 5 on which is a ratchet 37. The levers 35 and 36 carry pawls 38 and 39 which are adapted to intermittently and alternately engage the ratchet 37 whereby a continuous movement will be imparted to the shaft 5 so as to actuate the apron 4.

The position of the block 28 with relation to the pivoted end of the arm 23 will determine the speed at which the apron travels. For example, if the block is moved by the link 29 and lever 30 to a position immediately adjacent to the pivot 24 of the arm 23, the ratchet 37 will not be actuated. As the block is moved away from the pivot 24 the speed of the ratchet is increased due to the fact that the greater the leverage the greater the travel of the pawls at each intermittent operation. It will thus be apparent that the feed can be stopped without stopping the picker roller.

By reference to Fig. 2 it will be observed that the shaft for the compression roller 16$^a$ is driven by a gear 38$^a$ which is in mesh with a gear 39$^a$ on the end of the shaft 5 remote from the ratchet 37.

Means is provided for changing the direction of feed of the dust conveyer. This is made possible by the peculiar form of the pawl 25 provided with two teeth 40 and 40$^a$. When the pawl and ratchet for the dust conveyer are operating as illustrated in Fig. 1, the tooth 40$^a$ which is rigidly arranged on the pawl will engage one of the teeth on the ratchet 27 as the pawl moves in an upward direction so that the ratchet will be turned from right to left imparting a corresponding movement to the conveyer worm. If it is desired to reverse the movement of the conveyer the ratchet 27 may be removed and reversed and the pawl 25 may be removed and reversed so that the other tooth 40 of the pawl will engage the teeth on the down-stroke of said pawl thereby reversing the direction of movement of the ratchet and the conveyer. One of the principal advantages of arranging the dirt conveyer reversibly is that it is not necessary to carry in stock a right-and left-hand conveyer. Thus a single conveyer can be arranged to be placed over the gin having either a drive belt on the right-hand side or on the left-hand side. By thus making the conveyer reversible said conveyer can be arranged to always discharge the dirt on the side opposite to the main drive belt so as to keep the belt free from said dirt. Only one discharge opening is shown in the drawings, see Fig. 2, but it will be understood that the opposite side of the machine is provided with a similar discharge opening which in Fig. 1 is hidden by the gear 27.

The hinged part 12 of the feeder has a heavy portion to one side of the center of gravity so that it will at all times remain closed unless disturbed by the operator. If the parts become choked, however, as, for example, if cotton becomes clogged between the picker teeth and the screen, the congestion can be easily relieved by swinging the hinged part outwardly until a remedy is effected.

The bearing 41 carried by the cleaner engages the button 42 on the discharge chute 14 to assist in supporting said chute in proper position with relation to the casing so that said chute 14 is removably secured thereto.

Having thus described the invention, what is claimed as new and desired to be secured by Letters Patent is:

1. A cotton cleaning feeder comprising a casing, an endless apron within the casing, means for driving it, a picker roller adjacent to the endless apron, a movable part forming a portion of the casing a screen carried by the movable part and in rear of the picker roller, and a compression roller above the apron; substantially as described.

2. A feeder for cotton gins comprising a casing having an endless apron therein, a picker roller at one end of the apron, a movable part forming a portion of the casing, a screen carried by the movable part, and a conveyer beneath the screen; substantially as described.

3. In a cotton cleaner and feeder, the combination with a casing having entrance and discharge openings, of a substantially horizontal carrier within the casing, a feed-roller beyond the front end of the carrier, a picker cylinder disposed to remove the cotton from the interval between the carrier and feed roller, a hinged screen-concave surrounding the lower side of the picker cylinder, and a door located in one wall of the casing to facilitate access to the screen, which when swung on its hinge permits access to the picker cylinder; substantially as described.

4. In a cotton cleaning feeder, the combination with an endless apron, of a driving roller therefor, a shaft carrying said roller, mechanism for driving said shaft comprising a ratchet fastened thereto, a rocking lever, pawl-carrying toggles slidably connected to the lever and connected to the ratchet shaft, and means for sliding the toggle lever connection on the rocking lever to govern the duration of engagement of the pawls with the ratchet; substantially as described.

5. In a feeder for cotton gins, the combination with an endless apron, means for driving it including a ratchet, means for driving the ratchet comprising a rocking arm, a block slidable upon the arm, toggle levers connected to said block, and pawls carried by the toggle levers for alternately engaging said ratchet; substantially as described.

6. The combination with a shaft, of a ratchet thereon, a rocking lever, toggles connected to the shaft, a toggle support carried by the lever and connected to said toggles, oppositely moving pawls carried by the toggles, a pitman for driving the rocking arm, and a lever mechanism for sliding the toggle-support toward and away from the fulcrum of the rocking arm; substantially as described.

7. In a cotton cleaning feeder, the combination with means for feeding the cotton, means for separating the dust therefrom, a dust-conveyer, of a ratchet forming a part of the dust conveyer mechanism, a ratchet comprising part of the feeding means, a rocking lever, pawls actuated by the rocking lever for actuating the feeding ratchet, means for governing the duration of the engagement of the pawls with said feeding ratchet, a pitman for actuating the rocking lever, and a pawl connected to the pitman and engaging the ratchet on the dust-conveyer; substantially as described.

8. In a cotton cleaning feeder, the combination with means for feeding the cotton, means for separating dust therefrom, and a dust conveyer, of a ratchet comprising part of the feeding means, a ratchet on the conveyer, pawls for engaging the respective ratchets, and a lever mechanism for simultaneously actuating said pawls, the pawl for the conveyer and the ratchet on the conveyer being reversible whereby the reverse position of the ratchet and pawl will reverse the movement of the conveyer; substantially as described.

9. In a cotton cleaner and feeder, a casing having an opening for receiving the cotton to be cleaned, condensing mechanism located out of the vertical plane of said opening, and comprising condensing members between which the cotton is condensed, means for conveying cotton to the condensing mechanism from the receiving opening in the casing, and cleaning mechanism including a screen and a picker cylinder, the latter being disposed in coöperative proximity to the condensing mechanism to engage and uniformly remove the condensed cotton; substantially as described.

In testimony whereof, I hereunto affix my signature, in the presence of two witnesses, this 21st day of June 1904.

JOHN R. FORDYCE.

Witnesses:
J. MELANCON,
A. W. HALL.